United States Patent [19]

Yamagata et al.

[11] Patent Number: 4,768,219
[45] Date of Patent: Aug. 30, 1988

[54] CORDLESS TELEPHONE

[75] Inventors: Masato Yamagata; Kazushi Tabe, both of Kanagawa, Japan

[73] Assignee: Sony Corporation, Tokyo, Japan

[21] Appl. No.: 71,204

[22] Filed: Jul. 8, 1987

[30] Foreign Application Priority Data

Jul. 18, 1986 [JP] Japan .................. 61-169212

[51] Int. Cl.⁴ .............................. H04Q 7/04
[52] U.S. Cl. ........................ 379/61; 379/63
[58] Field of Search ............. 379/61, 62, 63, 60

[56] References Cited

U.S. PATENT DOCUMENTS

| | | | |
|---|---|---|---|
| 4,628,152 | 12/1986 | Akerberg | 379/61 |
| 4,646,345 | 2/1987 | Zduner et al. | 379/62 |
| 4,654,879 | 3/1987 | Goldman et al. | 455/33 |
| 4,656,653 | 4/1987 | Oda et al. | 379/61 |
| 4,672,657 | 6/1987 | Dershowitz | 379/63 |
| 4,694,485 | 9/1987 | Iwase | 379/62 |
| 4,698,839 | 10/1987 | De Vaney et al. | 379/60 |

Primary Examiner—Robert Lev
Attorney, Agent, or Firm—Lewis H. Eslinger

[57] ABSTRACT

A multichannel access cordless telephone has a base unit and a handset unit which, in a standby mode, each independently scan a plurality of communication channels to detect interference thereon and to record those channels on which interference is detected. Thereafter, in a talk mode of the cordless telephone, one of the base unit and the handset unit scans the communication channels other than the detected ones previously recorded to detect a vacant one of the communication channels and to establish communication between the handset unit and the base unit thereover.

8 Claims, 8 Drawing Sheets

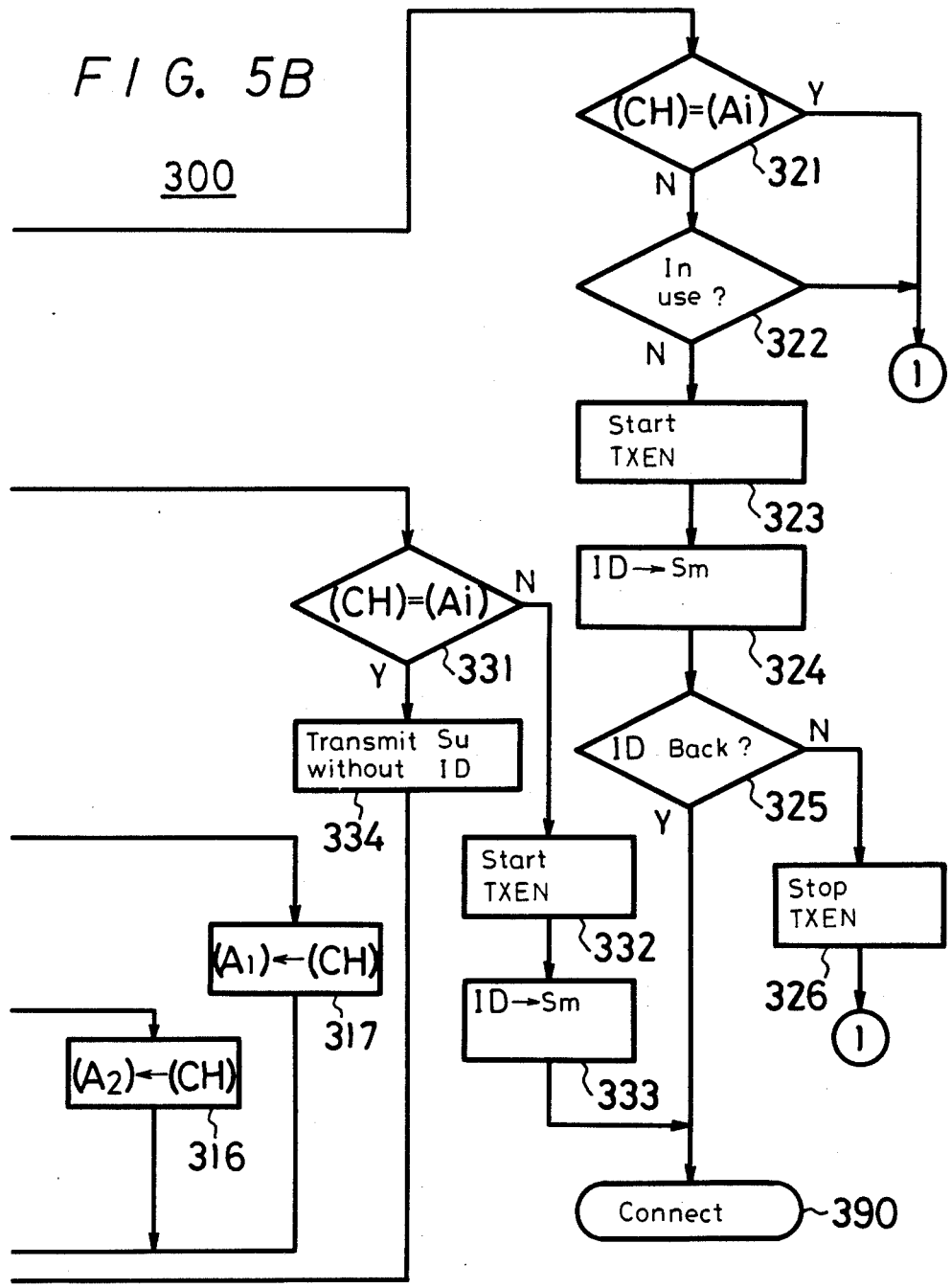

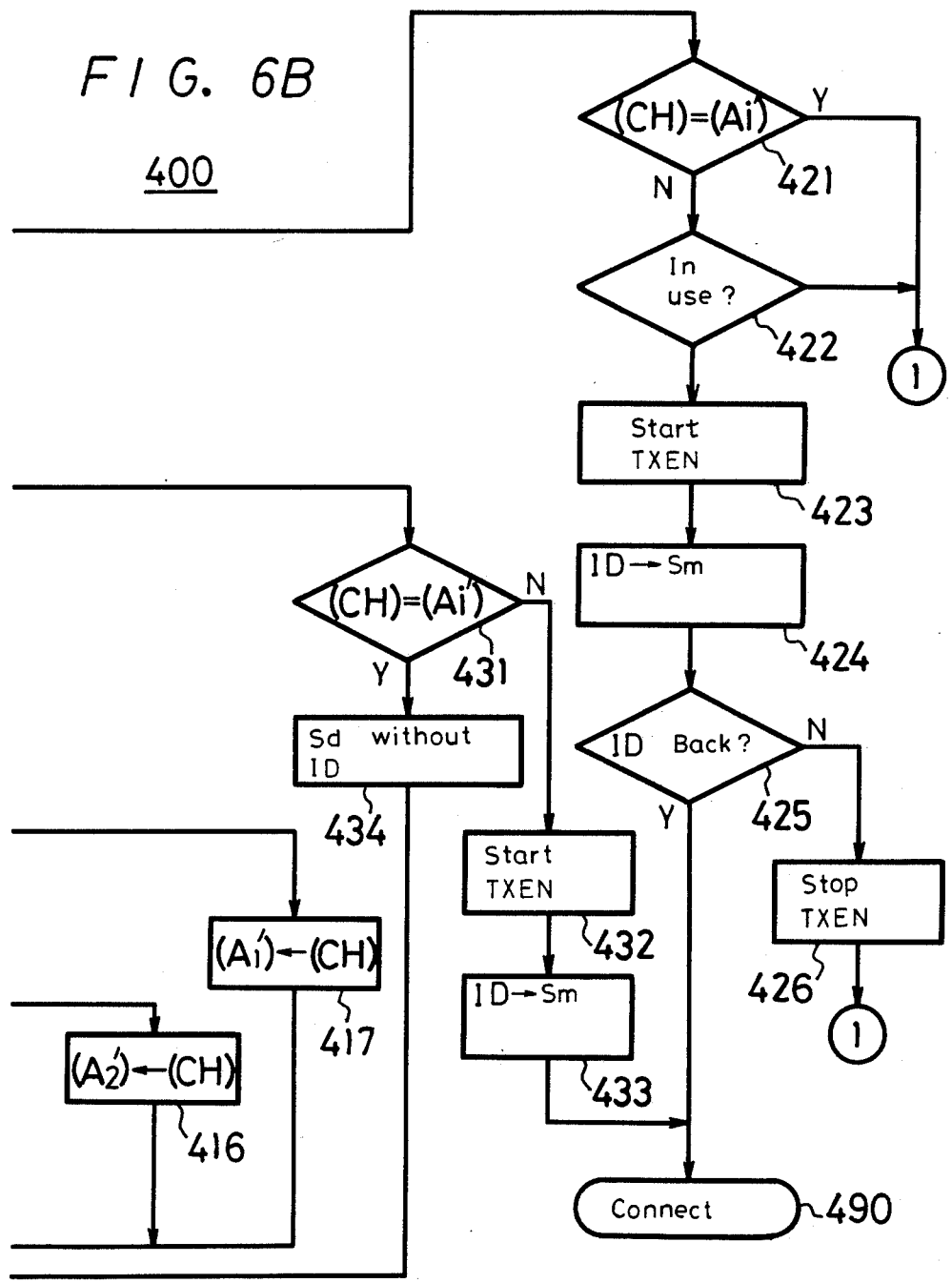

CORDLESS TELEPHONE

FIELD OF THE INVENTION

The present invention relates generally to cordless telephones, and in particular relates to a cordless telephone operable to avoid interference from other cordless telephones.

BACKGROUND OF THE INVENTION

The standard telephone consists of a base unit and a handset unit connected to each other by an electrical cord. The base unit itself is connected by another cord to a receptacle on a wall, telephone pole or a similar immovable structure to which the telephone network line extends. Therefore, the range of movement of the operator of the telephone is quite limited. Even when the cords connecting the handset unit to the base unit and the base unit to the wall are long, it can be cumbersome either to move the entire telephone around to make calls from different locations or to walk around with the handset unit once a call has been placed. The simple fact that there is always a continuous physical connection between the person making the phone call and the immovable wall or other fixed structure can be a great inconvenience.

The cordless telephone represents a significant improvement over the standard telephone. In the conventional cordless telephone, the base unit is still connected to the receptacle on the immovable wall or the like by a cord so that message signals from the telephone network line may be received and transmitted. However, the handset unit of the cordless telephone is an independently operative unit from which calls may be made and by which calls may be received with no physical connection to the base unit. The handset unit has a transmitting/receiving system or transceiver, a loudspeaker in the earpiece and a microphone in the mouthpiece. The base unit and the handset unit of the cordless telephone communicate with each other over a communication channel established by the transmission and reception of electromagnetic waves, conventionally radio waves. The handset unit may then be taken considerable distances from the base unit while still making and receiving telephone calls. Since there is no telephone cord extending between the handset unit and the base unit, the operator is free to move about without hindrance.

Typically there are ten duplex channels permitted for each system occupying a bandwidth set by the Federal Communications Commission. Cordless telephones using all ten duplex channels therefore may not have a separate control channel over which control information may be transmitted for determining which duplex channel will be selected for use during a particular conversation. This control information must be transmitted over one of the ten duplex channels themselves.

In order to transmit such control information without interfering with other telephone calls already in progress, a multichannel access (MCA) system has been proposed in which the cordless telephone searches for a vacant channel whenever an outgoing call is to be made or an incoming call is received and then the handset unit and base unit communicate with each other over the vacant channel. This permits a number of cordless telephones to be used simultaneously within the same general area without creating interference for each other by multiple transmissions over the same duplex channel. However, it is important to ensure that the cordless telephone does not erroneously attempt to establish communication over a channel with interference or already in use.

Although ten duplex channels are permitted for cordless telephones, many conventional cordless telephones are built with only one duplex channel available therein. As a result, if an MCA system cordless telephone identifies a vacant channel at the start of an incoming/outgoing call and attempts to establish communication thereover, another cordless telephone built to use only the identified channel may start to use the identified channel during the initial set-up procedure and may cause interference with the MCA system cordless telephone.

Furthermore, the MCA system cordless telephone will scan every channel in sequence at the start of the talk mode to identify a vacant channel and so may take a relatively long time to establish communication.

OBJECTS AND SUMMARY OF THE INVENTION

Accordingly, it is an object of the present invention to provide an improved cordless telephone which avoids the above-described difficulties of the prior art.

It is another object of the present invention to provide an improved cordless telephone which is capable of eliminating the above-identified interference.

It is yet another object of the present invention to provide an improved cordless telephone which will not establish communication over a channel already in use.

It is a further object of the present invention to provide a cordless telephone which detects interference separately at the base and handset units to permit a double check against such interference.

It is still a further object of the present invention to provide a cordless telephone which rapidly establishes communication over a channel without interference.

In accordance with the present invention, a cordless telephone has a base unit connectable to a telephone network line for receiving and transmitting signals therethrough and a handset unit selectively separable from the base unit, the base and handset units including respective means for the transmission and reception of signals therebetween over any one of a plurality of communication channels, the cordless telephone further comprising channel scanning means for scanning the plurality of communication channels, the channel scanning means being operative in a standby mode of the cordless telephone for detecting the ones of communication channels on which there is interference, memory means for recording the detected ones of the communication channels on which there is interference, the channel scanning means further being operative in a talk mode at one of the base and handset units to scan the communication channels other than the detected ones of the communication channels recorded in the memory means to detect a vacant one of the communication channels, and control means for establishing communication between the handset unit and the base unit in the talk mode of the cordless telephone over the detected vacant communication channel.

In a further development of the present invention, the channel scanning means detects the communication channels on which there is interference separately at the handset and base units and avoids establishing communication over any channel detected with interference at either unit.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIGS. 5A and 5B are respectively halves of a flowchart of a control program of the handset unit of FIG. 3;

FIGS. 6A and 6B are respectively halves of a flowchart of a control program of the base unit of FIG. 4.

DESCRIPTION OF THE PREFERRED EMBODIMENTS

Figure 1:
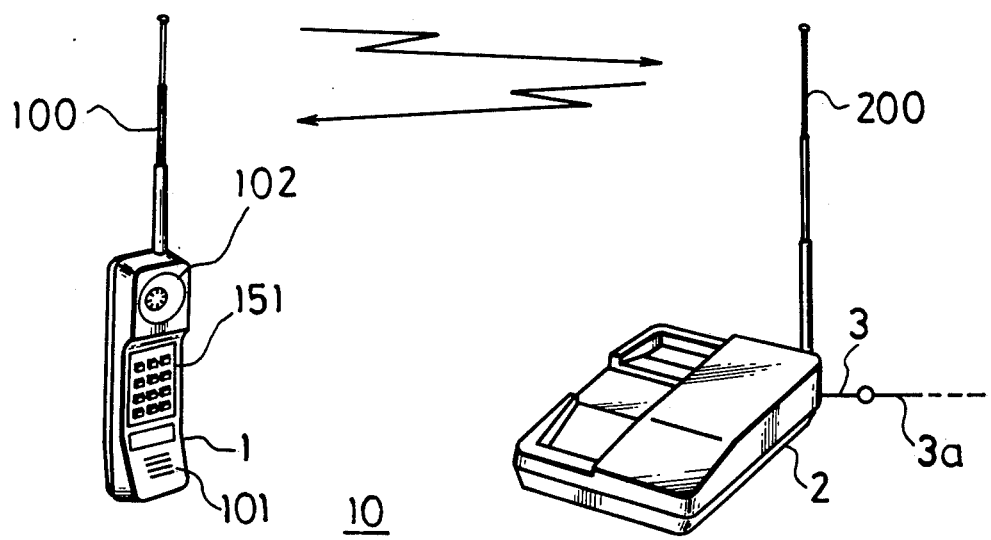
FIG. 1 is a perspective view of a cordless telephone of a type to which the present invention may be applied, with a handset unit being shown separated from a base unit.

Referring to the drawings in detail, and initially to FIG. 1 thereof, a cordless telephone 10 of a type to which the present invention may be applied is there shown to include a handset unit 1 and a base unit 2. Base unit 2 is connected by a telephone cord 3 to an outlet or receptacle in a wall, a telephone pole, or another fixed structure, so that it may both receive and transmit telephone message signals through a telephone network line 3a and also may be powered thereby. An antenna 100 on handset unit 1 and a corresponding antenna 200 on base unit 2 are used to create a communication channel between the two units by the transmission and reception of radio waves, schematically illustrated in FIG. 1 by the arrows extending between the antennas. As is conventional, handset unit 1 includes a ten-key panel 151 for making or dialing outgoing calls, and a mouthpiece 101 and an earpiece 102 with which a microphone and a loudspeaker (not shown) are, respectively, associated. A telephone number may be entered on ten-key panel 151, and corresponding information is transmitted over the communication channel to base unit 2 and thence to telephone network line 3a. Alternatively, when base unit 2 receives a message signal from the telephone network line indicating that an incoming call is present, a signal from base unit 2 causes a ringing sound in handset unit 1 to indicate the existence of the incoming call.

The standard maximum separation of such a handset unit 1 and base unit 2, which is called the service area, is about 300 meters and is set by the Federal Communications Commission. The ten duplex channels typically permitted for each system are provided with the upper channel having a frequency in the 49 MHz band and the lower channel having a frequency in the 46 MHz band. Of course, such operating parameters are set by the FCC and do not form a part of the present invention.

As defined in the present application, cordless telephone 10 is considered to be in a standby mode when it is powered but no telephone message signals appear at base unit 2 and handset unit 1 is disabled, for example by means of a talk switch 152 discussed below with reference to FIG. 3. Correspondingly, cordless telephone 10 is considered to be in a talk mode whenever either of base unit 2 and handset unit 1 is in a "talk" mode, that is, whenever a telephone message signal appears at base unit 2 or whenever handset unit 1 is put in its talk mode by talk switch 152.

Figure 2A:
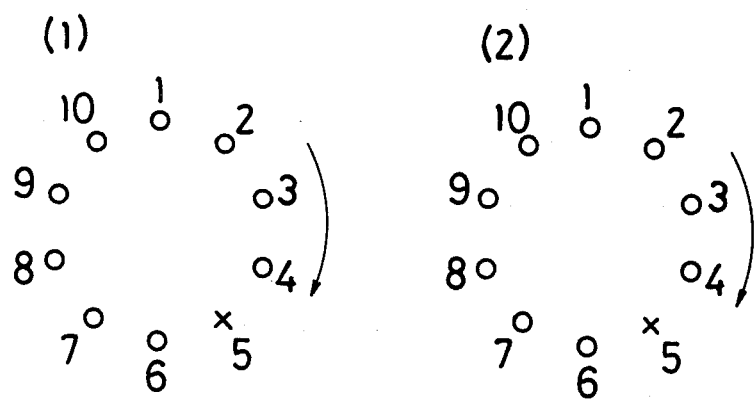
FIG. 2A is a diagram illustrating a scanning operation of an MCA cordless telephone in a standby mode.
Figure 2B:
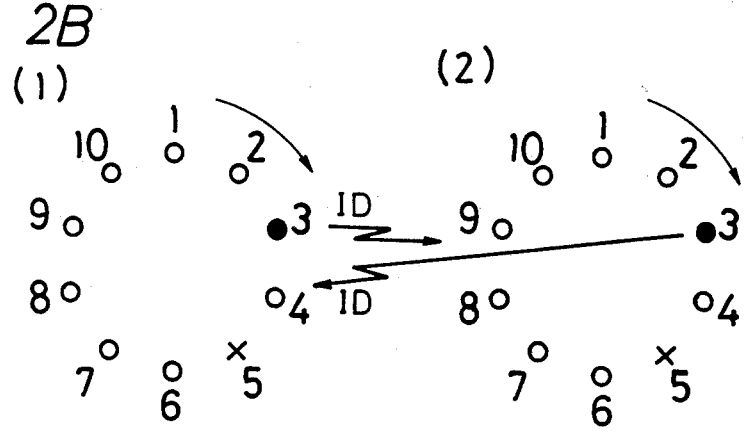
FIG. 2B is a diagram illustrating a scanning operation of the cordless telephone of FIG. 2A in making an outgoing telephone call.
Figure 2C:
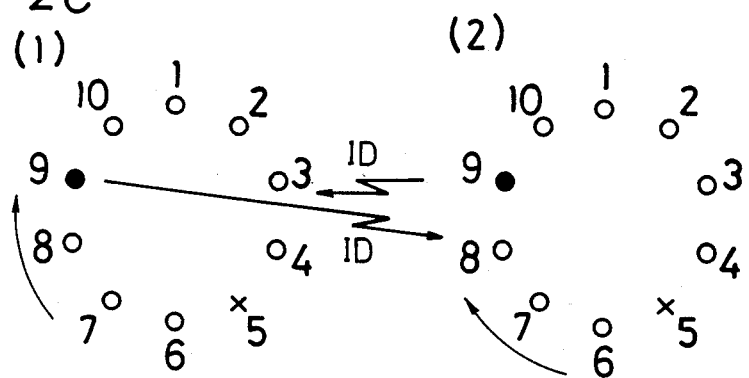
FIG. 2C is a diagram illustrating a scanning operation of the cordless telephone of FIG. 2A in receiving an incoming telephone call.

Referring now to FIGS. 2A–2C, there are illustrated therein the scanning operations in the standby and talk modes of an MCA system cordless telephone as previously proposed by the assignee of the present invention in the Official Gazette of Laid-Open Japanese Patents Publication No. 59-186436 (Japanese Patent Application No. 58-61301). With regard to FIGS. 2A–2C, the diagrams on the left under heading (1) illustrate the channel scanning operations of handset unit 1, while those on the right under heading (2) illustrate the channel scanning operations of base unit 2. Numerals 1–10 designate channel numbers, symbol 0 indicates a channel not in use, symbol 0 indicates a channel used by cordless telephone 10 itself, and symbol X indicates a channel used by another cordless telephone.

As shown in FIG. 2A, when cordless telephone 10 is in the standby mode, both handset unit 1 and base unit 2 repeatedly and independently scan the channels in sequence, each waiting either to be enabled or to receive a call from the other. As shown in FIG. 2B, when handset unit 1 is enabled to place cordless telephone 10 in the talk mode to place a telephone call, handset unit 1 searches to detect a vacant channel and stops its scanning procedure when such a vacant channel is detected. In the present example, it is assumed that channel No. 3 is detected as vacant. Thereupon, handset unit 1 attempts to establish communication between itself and base unit 2 by repeatedly transmitting to base unit 2 over channel No. 3 an identifying code uniquely identifying cordless telephone 10. At the same time, handset unit 1 looks for base unit 2 to retransmit back the same identifying code over channel No. 3 so as to complete the establishment of communication therewith. Meanwhile, base unit 2 continues to scan the channels in succession and will receive the identifying code from handset unit 1 when it next scans the channel selected by handset unit 1, that is, channel No. 3. Base unit 2 is thereby enabled and transmits the identifying code back to handset 1. When handset unit 1 receives the identifying code transmitted back from base unit 2, communication is fully established with both handset unit 1 and base unit 2 set in the talk mode. Thereafter, a telephone number may be transmitted from handset unit 1 to base unit 2 over channel No. 3 in a manner to be described below and then a telephone call may be put through and completed.

Correspondingly, as shown in FIG. 2C, if an incoming telephone message signal is received over telephone network line 3a, the roles of handset unit 1 and base unit 2 are reversed. Now it is base unit 2 which first is enabled and scans to detect a vacant channel, now assumed to be channel No. 9. Base unit 2 transmits the identifying code to handset unit 1 over channel No. 9. When handset unit 1 detects the identifying code on reaching channel No. 9 during its scanning process, it retransmits the identifying code back to handset 1 to place both units in the talk mode and establish communication. It will be seen that the MCA system cordless telephone is able to prevent interference when an outgoing call is made or when an incoming call is received even though other telephones may be simultaneously operating near by. However, if a conventional cordless telephone outside the MCA system begins communication over its one duplex channel, and that duplex channel corresponds to one previously detected as vacant by the MCA cordless telephone, there will be interference.

Before discussing the specific features of the present invention, a brief description of the underlying construction and operation of cordless telephone 10 will be given as background. Referring now to FIGS. 3 and 4, important portions of the circuitry contained within handset unit 1 and base unit 2, respectively, are therein illustrated. It should be noted that the circuitry within these two units contains many corresponding elements, so that the two figures and their accompanying description should be considered together.

Handset unit 1 (FIG. 3) has a transceiver which includes a transmission system 110 comprised of elements bearing reference numerals 111 to 115, and a receiving system 120 comprised of elements bearing reference numerals 121 to 128. Base unit 2 (FIG. 4) similarly has a transceiver which includes a transmission system 210 comprised of elements bearing reference numerals 212 to 215, and a receiving system 220 comprised of elements bearing reference numerals 221 to 227. Base unit 2 further includes a connecting circuit 230, including elements 231 and 232 and serving to connect transmission system 210 and receiving system 220 to telephone network line 3a. The function and operation of these elements will be described as signals are transmitted between the two units. In the illustrated embodiment, the signals are transmitted over a selected one of the 10 allowed duplex channels, each containing an upper channel and a lower channel. The present invention is particularly directed to the selection of the duplex channel, as will be fully described below.

For the transmission of a signal from handset unit 1 (FIG. 3), an audio signal St from a microphone 111 contained within mouthpiece 101 of handset unit 1 is supplied through a low frequency amplifier 112 to a voltage controlled oscillator (not illustrated) within a phase locked loop (PLL) circuit 113, which outputs a corresponding high frequency FM signal Su in the upper channel of a selected one of the duplex channels. For this purpose, PLL circuit 113 is provided with a channel selecting signal CH used to determine the frequency of a local oscillator signal used to frequency convert the FM signal to radio frequencies. Signal Su is supplied through a high frequency amplifier 114 and a band pass filter 115 with a pass band including all the upper channels to antenna 100, by which it is transmitted as a radio frequency wave to base unit 2 over the communication channel.

Referring now to FIG. 4, signal Su transmitted from handset unit 1 is received at base unit 2 by antenna 200 and is supplied through a band pass filter 221, also having a pass band including all the upper channels, and a high frequency amplifier 222 to a mixing circuit 223. Mixing circuit 223 receives a local oscillation signal from a local oscillator (PLL) circuit 224 receiving channel selecting signal CH to frequency convert the signal Su to an FM intermediate frequency signal. This FM signal is supplied through an intermediate frequency amplifier 225 to an FM demodulating circuit 226, wherein it is demodulated to produce audio signal St. Audio signal St is passed to telephone network line 3a through an audio frequency amplifier 227 and the signal transmission circuit 230 comprising hybrid circuit 231, and relay circuit 232. Hybrid circuit 231 has solid state components and moving contacts to form a 2-line to 4-line transition between the electronic receiving system 220 and electromechanical relay circuit 232. Relay circuit 232 includes a relay of the type to make and break the connection between base unit 2 and telephone network line 3a, and a hold relay which in a first position can hold a connection with telephone network line 3a while disconnecting it from hybrid circuit 231, so that telephone communication with telephone network line 3a is temporarily interrupted while keeping the incoming call available on telephone network line 3a. The hold relay has a second position in which telephone network line 3a is made available for connection to hybrid circuit 231 to release telephone communication.

The transmission of signals from base unit 2 to handset unit 1 will now be described. When incoming message signals are received from telephone network line 3a, an audio signal Sr is supplied through relay circuit 232, hybrid circuit 231 and low frequency amplifier 212 to a VCO (not illustrated) of a PLL circuit 213, which outputs a corresponding high frequency FM signal Sd in the lower channel of the same duplex channel as signal Su. PLL circuit 213 is supplied with channel selecting signal CH for this purpose. Signal Sd is supplied through a high frequency amplifier 214 and a band pass filter 215 with a pass band including all the lower channels to antenna 200, by which it is transmitted to handset 1 over the communication channel.

Referring back to FIG. 3, signal Sd is received by antenna 100 and is supplied through a band pass filter 121 with a pass band including all the lower channels and a high frequency amplifier 122 to a mixing circuit 123. Mixing circuit 123 is supplied with a local oscillation signal from a local oscillator (PLL) circuit 124 receiving channel selecting signal CH, so that signal Sd is frequency converted to an FM intermediate frequency signal. This FM signal is supplied through an intermediate frequency amplifier 125 to an FM demodulating circuit 126, wherein it is demodulated to the audio signal Sr and supplied through an audio frequency amplifier 127 to an electro-audio transducer or loudspeaker 128 contained within an earpiece of handset unit 1.

Figure 3:
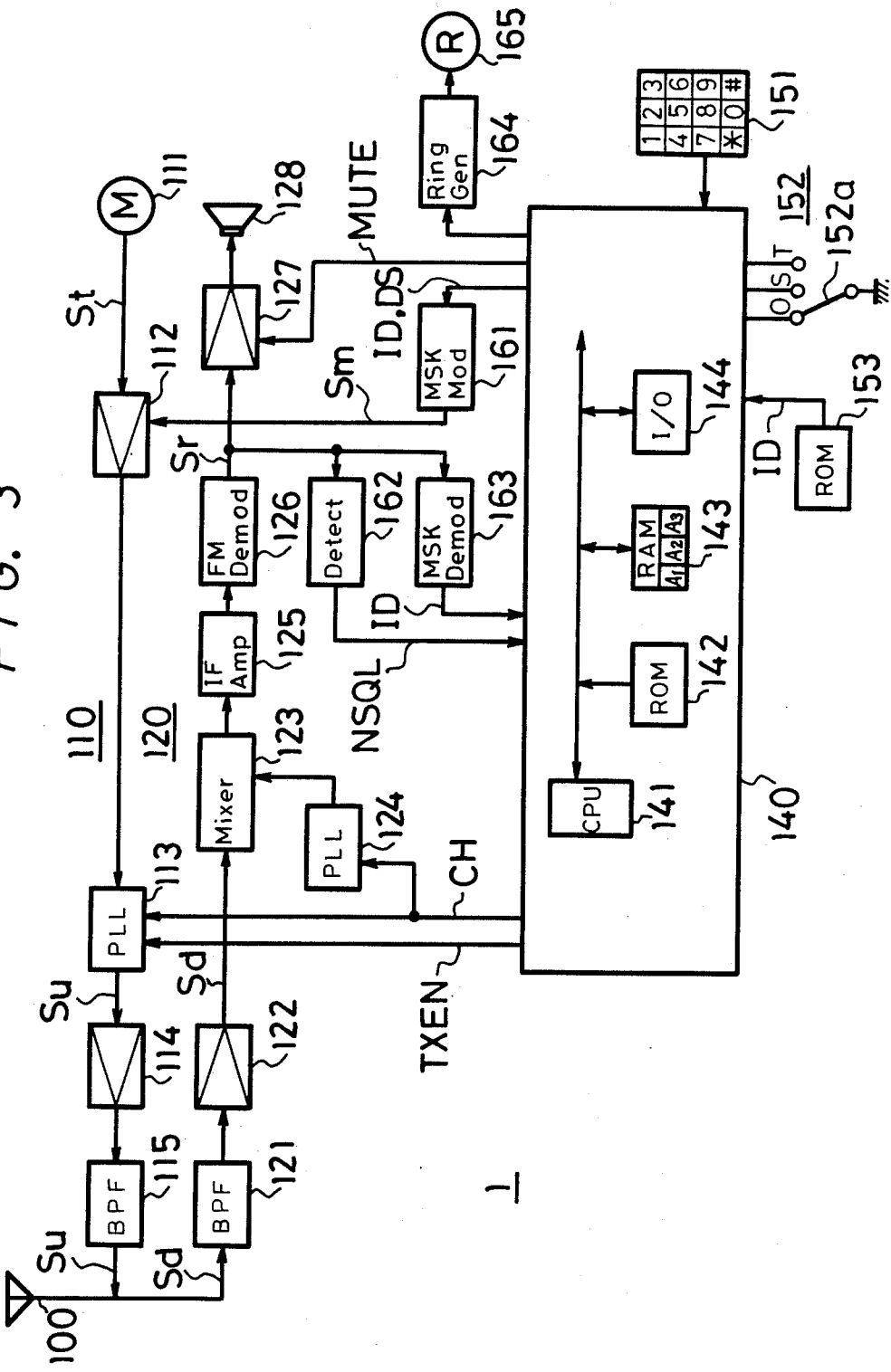
FIG. 3 is a block diagram illustrating a portion of the circuitry of a handset unit of a cordless telephone according to a preferred embodiment of the present invention.
Figure 4:
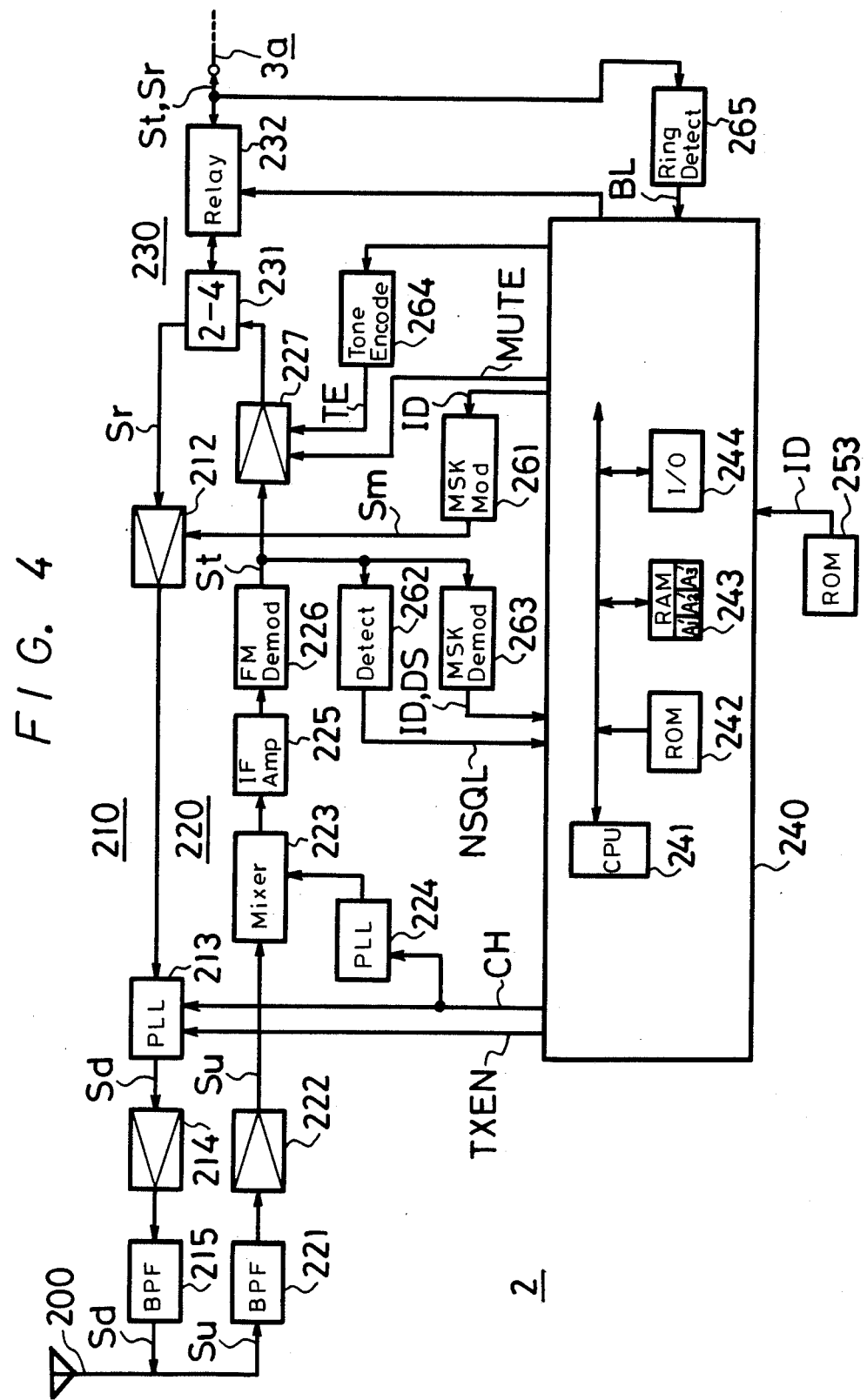
FIG. 4 is a block diagram illustrating a portion of the circuitry of a base unit of the cordless telephone according to the preferred embodiment.

In accordance with an important aspect of the present invention, handset unit 1 further contains a control circuit, generally designated by reference numeral 140 in FIG. 3, and base unit 2 similarly contains a control circuit, generally indicated by reference numeral 240 in FIG. 4. These control circuits may each advantageously be comprised in whole or in great part by a microprocessor or microcomputer contained on a single integrated chip. An advantageous example is the MSM-6404 microcomputer IC manufactured by Oki Electric Industry Co., Ltd. Control circuit 140 includes a central processing unit (CPU) 141, for 4-bit parallel processing, a read only memory (ROM) 142, which stores control programs for controlling the operation of CPU 141, a random access memory (RAM) 143 serving as a work and storage area, and an input/output (I/0) port 144. Similarly, control circuit 240 includes a CPU 241, a ROM 242, a RAM 243 and an I/0 port 244, each performing a function corresponding to that of the element of control circuit 140 having the same two final digits in the reference numeral.

Importantly RAM 143 includes three storage areas $A_1$, $A_2$ and $A_3$, collectively referred to herein as area $A_i$. RAM 243 similarly includes three areas $A_1'$, $A_2'$ and $A_3'$, collectively referred to herein as areas $A_i'$. Areas $A_i$ and $A_i'$ are each adapted to store one of ten identifiers uniquely respectively associated with the ten duplex channels and, in particular, to store an identifier of a channel on which interference is detected. A default identifier having a value of 0 is stored in areas $A_i$, $A_i'$ of RAMs 143, 243 when no channel identifier is stored therein. In addition, ROM 142 stores a control program 300 and ROM 242 stores a control program 400. These programs 300, 400 are used to control the operations of control circuits 140, 240, respectively, in scanning the communication channels and establishing communication between handset unit 1 and base unit 2, as discussed below.

Connected to control circuit 140 for controlling the latter are ten-key panel 151, talk switch 152 and an ID ROM 153. Ten-key panel 151 has conventional nonlock push button switches for inputting the telephone number to be called. Talk switch 152 is a three position change-over switch used for selecting an operational mode of handset unit 1. When a movable contact 152a of talk switch 152 contacts fixed contact O (the OFF position), the power is turned off to all the elements within handset unit 1 except control circuit 140, to place handset unit 1 in an off mode. When movable contact 152a contacts fixed contact S (the STANDBY position), handset unit 1 is placed in a standby mode to await the signal Sd from base unit 2 and to perform a standby scanning operation as discussed below. When movable contact 152a contacts fixed contact T (the TALK position), handset unit 1 is placed in its talk mode and the communication channel between handset unit 1 and base unit 2 may be established.

ID ROM 153 stores an identifying code ID uniquely identifying cordless telephone 10. A corresponding ID ROM 253 is connected to control circuit 240 and stores the same identifying code ID. Handset unit 1 and base unit 2 are designed to establish communication only with each other by means of the exchange of identifying code ID so as to avoid interference with other cordless telephones and to remove the possibility of wiretapping and unauthorized use. The general operation of cordless telephone 10 in exchanging identifying code ID is as follows.

Figure 7A:
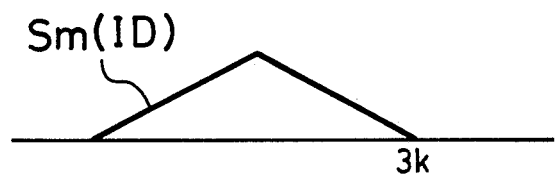
FIGS. 7A and 7B are respectively graphs showing the frequency spectrum of signals transmitted between the handset and base units before and after communication is established.
Figure 7B:
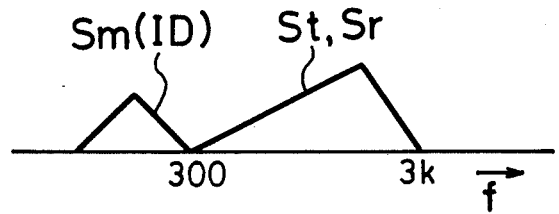

An MSK (minimum shift key) modulating circuit 161 is connected to control circuit 140 for converting binary signals supplied thereto to an MSK signal Sm in the audio frequency band. These binary signals include identifying code ID, a dial signal DS corresponding to the telephone number entered through ten-key panel 151 and possibly other control signals. MSK signal Sm is supplied to audio frequency amplifier 112 for transmission to base unit 2. In particular, before communication has been established between handset unit 1 and base unit 2, MSK signal Sm is designed to occupy an audio frequency band as illustrated in FIG. 7A and at this initial stage is transmitted at high speed, for example, 1.2 kbps, so as to rapidly establish such communication. On the other hand, after communication has been established, if it is desired to continue transmitting identifying code ID or other control signals, MSK signal Sm is transmitted in a frequency band lower than that of signals St and Sr at a relatively lower rate, for example, 110 bps, as illustrated in FIG. 7B.

In base unit 2 (FIG. 4) the output of FM demodulator 226 is supplied to an MSK demodulator 263 wherein it is demodulated to provide the identifying code ID and other control signals encoded in MSK signal Sm. The demodulated signals are supplied to control circuit 240 for comparison with the identifying code ID stored in ID ROM 253. Base unit 2 similarly includes an MSK modulating circuit 261 for encoding the identifying code ID and other control signals in a signal Sm transmitted from base unit 2 to handset unit 1 in the same manner as described above. In handset unit 1, an MSK demodulating circuit 163 is supplied with the output of FM demodulating circuit 126 to demodulate the identifying code ID, control signals and other signals encoded in MSK signal Sm. The demodulated signals are supplied to control circuit 140.

Returning to the exchange of signals, when an incoming call is detected in base unit 2 and signal Sd is transmitted to handset unit 1, in handset unit 1, the output of FM demodulating circuit 126 is supplied to a reception detecting circuit 162 for detecting the presence or absence of signal Sd in the output. As is conventional, the frequency components of the output are different in the presence or absence of signal Sd. A detection signal NSQL generated by reception detecting circuit 162 when signal Sd is present is supplied to control circuit 140 and an appropriate control signal is supplied to a ring tone generator 164 for generating a bell sound signal. The bell sound signal is supplied to a ringer 165 causing it to generate a bell sound, i.e. handset unit 1 rings.

Control circuit 140 of handset unit 1 generates a transmission enable control signal TXEN and supplies it to PLL circuit 113 to control whether or not FM signal Su is output therefrom. As discussed in more detail below, the communication channel is established only when identity between identifying codes stored in base unit 2 and handset 1 and exchanged over a vacant channel is detected. When identity is detected, signal TXEN enables PLL circuit 113 to output signal Su, whereas if identity is not detected, signal TXEN disables PLL circuit 113.

Control circuit 140 also generates a muting signal MUTE supplied to audio frequency amplifier 127 when no telephone conversation is in progress, to prevent extraneous noise from being generated and output through transducer 128.

In base unit 2, a tone generating circuit 264 generates a tone encode signal TE corresponding to the telephone number for an outgoing call, which signal TE is supplied to audio frequency amplifier 227 and thence to hybrid circuit 231 for transmission to telephone network line 3a. A bell signal detecting circuit 265 is connected to telephone network line 3a to detect an incoming bell signal indicating the presence of an incoming call. The output detected signal BL of bell signal detecting circuit 265 is supplied to control circuit 240, which is responsive thereto to send a control signal in MSK signal Sm to control circuit 140, which in turn causes call tone generator 164 to generate its bell sound signal.

Thus, handset unit 1 will ring in response to the detection of an incoming telephone call.

In the preferred embodiment illustrated in FIG. 4, base unit 2 is without a switch corresponding to talk switch 152 and instead it is assumed that base unit 2 is normally in a standby mode until and unless a telephone message signal is received on telephone network line 3a or it is enabled through communication established by handset unit 1 in making an outgoing telephone call.

Turning now to the specifics of the present invention, cordless telephone 10 while in the standby mode detects which of the communication channels have interference thereon and records or memorizes these detected channels so as to avoid or skip them during a subsequent attempt to establish communication, that is, when an incoming telephone call is received or an outgoing telephone call is made while in the talk mode. Such interference may most likely be caused by another cordless telephone, but may also be caused by other apparatus or natural phenomena. It is recognized in the present invention that handset unit 1 and base unit 2 may be separated to such an extent that one unit may pick up interference on a particular channel while the other unit may fail to detect such interference, by reason of being considerably more removed from the source of the interference. Thus, in the preferred embodiment, each of handset unit 1 and base unit 2 independently scans the duplex channels to detect interference thereon and stores in the respective ROMs 143, 243 the identifiers of the detected channels. This provides a double check to avoid the use of a channel carrying interfering signals.

The operations of handset unit 1 and base unit 2 in the standby and talk modes are controlled in accordance with the respective control programs 300 and 400 stored in ROMs 142 and 242 and loaded into CPUs 141 and 241, respectively. These operations will now be described in connection with FIGS. 5A and 5B, together illustrating the flowchart for control program 300 for handset unit 1, and FIGS. 6A and 6B, together illustrating the flowchart for control program 400 for base unit 2.

Figure 5A:
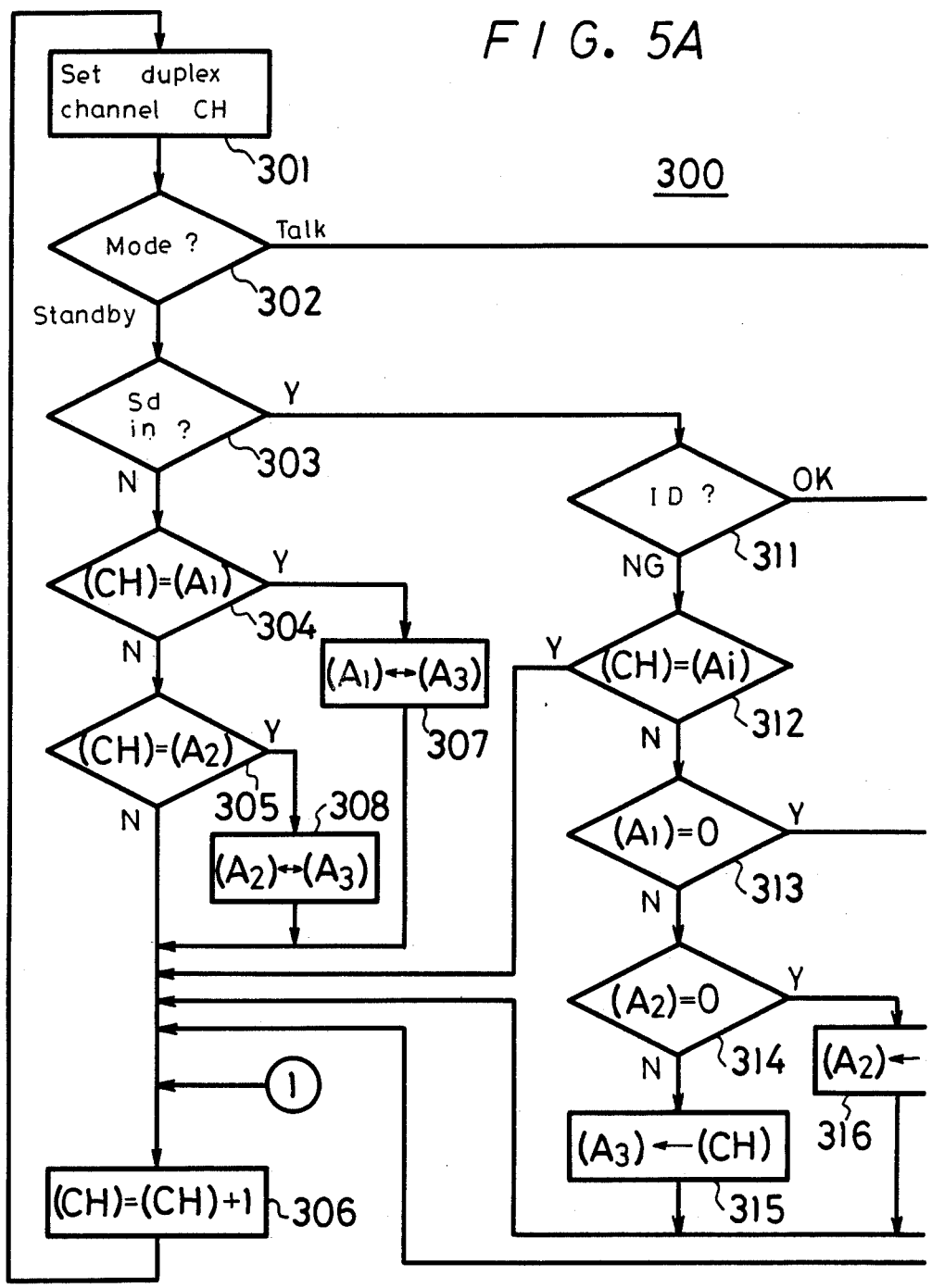

Referring first to FIG. 5A, when handset unit is in the standby mode, PLL circuits 113 and 124 are both controlled at step 301 by control circuit 140 producing a value (CH) of channel selecting signal CH to the up and down channels, respectively, of a present one of the duplex channels having an identifier associated therewith equal to a value (CH) of signal CH. In other words, each value (CH) of signal CH, which may for example range from 1 to 10 corresponding to the ten duplex channels, constitutes a unique identifier associated with a particular one of the duplex channels. At step 302, the position of talk switch 152 is checked. Initially, it is assumed that talk switch 152 of handset unit 1 is set in the standby position at contact S placing handset unit 1 in its standby mode. Therefore, program 300 proceeds to step 303 wherein it is determined from signal NSQL whether a signal in the down channel set at step 301, which may be FM signal Sd or an interference signal, is being received. If no signal is being received, program 300 proceeds to step 304 in which the first identifier (A$_1$) stored in area A$_1$ of RAM 143 is compared with identifier (CH) of the channel set at step 301. If (CH) does not equal (A$_1$), program 300 proceeds to step 305 to compare identifier (CH) with identifier (A$_2$) stored in area A$_2$. If again (CH) does not equal (A$_2$), program 300 proceeds to step 306 wherein the value (CH) of channel selecting signal CH is incremented by 1 to designate the next channel in sequence, and program 300 returns to step 301. For so long as no signal or interference is detected on any of the channels, program 300 loops through steps 301–306, repeatedly scanning all the channels in turn, as illustrated in FIG. 2A.

The operation of handset unit 1 in its standby mode to detect interference on any of the communication channels and to store the respective identifiers in areas A$_i$ will now be described. In step 303, if it is detected that an FM signal Sd at the frequency of the down channel of the duplex channel set at step 301 is present, the program proceeds to step 311 to determine whether signal Sd includes therein identifying code ID identical to the identifying code ID stored in ROM 153. If identity is detected, then base unit 2 is attempting to establish communication upon receiving an incoming telephone call and program 300 proceeds to step 331 for a procedure to be discussed below. For the present, assuming no such identity is detected, that is, a different identifying code from another cordless telephone is included or there is no identifying code at all, program 300 proceeds to step 312 in which identifier (CH) is compared with identifiers (A$_i$) stored in area A$_i$ to determine whether the present channel has already been detected as containing interference. If identifier (CH) is equal to any of the stored identifiers, program 300 proceeds to step 306 to increment (CH). However, if identifier (CH) is unequal to all of the identifiers (A$_i$), program 300 proceeds to step 313 wherein it is checked whether the default identifier is stored in area A$_1$. If at step 313 the default identifier is stored in area A$_1$, so that (A$_1$) equals 0, program 300 proceeds to step 317 to store identifier (CH) in area A$_1$, and then returns to step 306. However, if a channel identifier is already stored therein, that is if (A$_1$) does not equal 0, program 300 proceeds to step 314 to check whether the default identifier is stored in area A$_2$. If the default identifier is stored in area A$_2$, so that (A$_2$) equals 0, program 300 proceeds to step 316 to store identifier (CH) in area A$_2$, and then returns to step 306. If, however, identifier is stored in area A$_2$, so that (A$_2$) does not equal 0, program 300 proceeds to step 315 to store identifier (CH) in area A$_3$, and the program returns to step 306.

Thus, as described above, when a channel is newly detected as containing interference during the standby mode, it is initially stored in area A$_3$ and thereafter is successively moved to area A$_2$ and then to A$_1$ as additional channels are detected with interference. If a fourth and higher order channels are detected with interference, their identifiers will successively displace each other in area A$_3$ during each cyclical scan of the ten duplex channels.

Returning now to the fundamental scanning operation of steps 301–306, if interference has been previously detected on a channel, its corresponding channel identifier, here assumed to be identifier (A$_1$), will be stored in area A$_1$ of RAM 143, and therefore, if the interference then stops, at some point during the successive scanning of the channels step 304 will detect that (CH) equals (A$_1$). At such point program 300 proceeds to step 307 in which identifier (A$_1$) stored in area A$_1$ and the identifier (A$_3$) stored in area A$_3$ are switched. If no channel identifier has yet been stored in area A$_3$, the execution of steps 304 and 307 will cause the identifier (A$_1$) to be stored in area A$_3$ and area A$_1$ will become vacant. In such a manner the channel identifier for this channel now without interference will be shifted to area A$_3$ and will be dropped when an interference is detected on a new channel. Program 300 then proceeds to step 306 to increment value (CH) to designate the next channel.

Correspondingly, if a channel identifier ($A_2$) is stored in area $A_2$ of RAM 143, then at step 305 at some point during the scanning, (CH) will equal ($A_2$). At such point, program 300 proceeds to step 308 in which the identifier ($A_2$) stored in area $A_2$ and the identifier ($A_3$) stored in area $A_3$ are switched, and program 300 then proceeds to step 306. By this means, the channel identifiers are stored in the ordered areas $A_i$ in a weighted order in which $A_1$ stores the most recently detected channel.

Figure 6A:
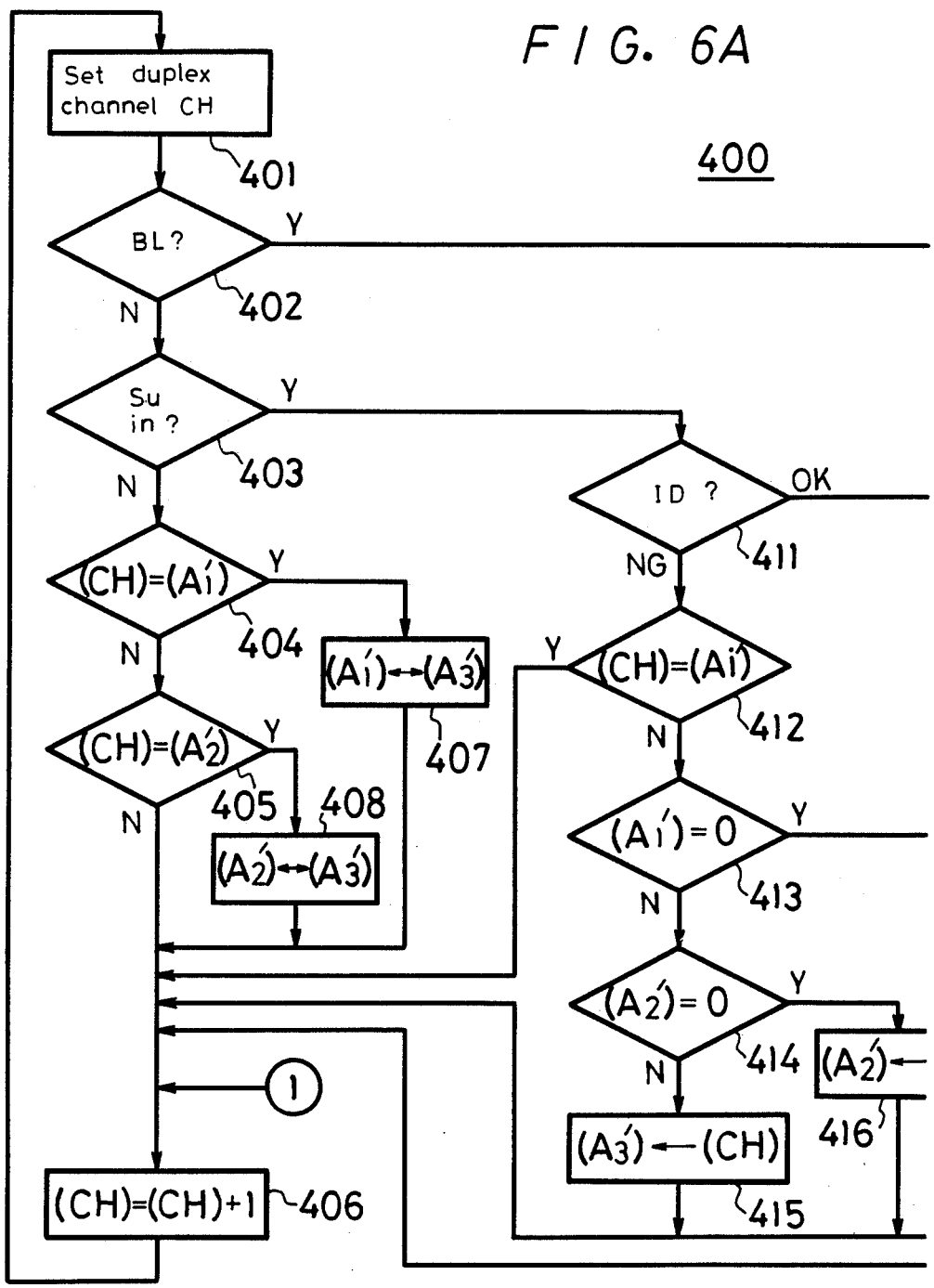

The operation of base unit 2 in the standby mode in detecting channels with interference and in storing the respective identifiers in ordered memory locations $A_1'$-$A_3'$ of RAM 243 is illustrated in FIG. 6A under the control of program 400. It will be seen that the operations effected by base unit 2 at steps 401 and 404–417 correspond precisely to the operations effected by handset unit 1 at steps 301 and 304–317, respectively. It is important to remember, however, that the channels set at steps 301 and 401 are not necessarily the same and indeed this feature helps to prevent the erroneous establishment of communication when base and handset units 1, 2 detect interference on different channels, as discussed below. Furthermore, the operations at steps 402 and 403 by base unit 2 are different from those of handset unit 1 at step 302 and 303. Specifically, at step 402, handset unit 2 detects the presence or absence of an incoming telephone message signal over telephone network line 3a by checking for the presence or absence of signal BL. If no incoming telephone message signal is present, program 400 proceeds to step 403 in which the presence or absence of a signal in the upper channel of the duplex channel set at step 401, such as FM signal Su is detected, as opposed to the detection of a signal in the lower channel in step 303 by handset unit 1. With these exceptions, the operations of handset unit 1 and base unit 2 in the standby mode are identical.

The operation of cordless telephone 10 in placing an outgoing telephone call from handset unit 1 over a channel without interference will now be explained. As described above, to initiate an outgoing telephone call, talk switch 152 is changed over to contact T to establish the talk mode at handset unit 1. This switching operation is detected at step 302 (FIG. 5A) and program 300 proceeds to step 321 (FIG. 5B) in which identifier (CH) is successively compared with the identifiers ($A_i$). If identifier (CH) does not equal any of identifiers ($A_i$), that is, if the present channel set at step 301 has not previously been detected as containing interference, program 300 proceeds to step 322 to check whether the present channel now is being used by another cordless telephone. Specifically, signal NSQL will indicate whether the channel set at step 301 is being used by another cordless telephone, for example by a conventional cordless telephone which will use only one particular channel regardless of the presence or absence of other telephone communications on that channel. If in fact the channel set at step 301 is not being used, program 300 proceeds to step 323 and control circuit 140 supplies enabling control signal TXEN to PLL circuit 113 to enable the transmission of signal Su. At step 324, identifying code ID is retrieved from ROM 153 and modulated to produce MSK signal Sm by modulator 161 and thereafter supplied to amplifier 112. Therefore, as illustrated in FIG. 2B, identifying code ID is transmitted to base unit 2 in FM signal Sd over the up channel of the duplex channel set at step 301. Identifying code ID is repeatedly transmitted at step 324 for a time period at least long enough to permit all the channels to be scanned by base unit 2 and an identifying code ID transmitted back therefrom and redetected in handset unit 1.

Meanwhile, base unit 2 has remained in the standby mode and has been sequentially scanning the channels by repeating the operations of steps 401–417 as described above. Now, however, at step 403 (FIG. 6A) when the channel set at step 401 is the same as the channel set at step 301 and over which signal Su is being transmitted from handset unit 1, signal Su will be detected and program 400 proceeds to step 411 to determine whether the correct identifying code ID is contained in the received signal Su. Since signal Su is in fact coming from the correct handset unit 1, program 400 proceeds to step 431 (FIG. 6B) in which identifier (CH) is compared with the identifiers ($A_i'$) previously stored in areas $A_i'$. If identifier (CH) does not equal any of identifiers ($A_i'$), thus indicating that at base unit 2 also the channel associated with identifier (CH) has not been detected as including interference, program 400 proceeds to step 432 in which transmission of FM signal Sd is enabled by the generation of signal TXEN. Then, at step 433 identifying code ID stored in ROM 253 is modulated to produce MSK signal Sm by modulator 261 and is supplied to amplifier 212. Therefore, as illustrated in FIG. 2B, identifying code ID is transmitted back to handset 1 in FM signal Sd through the down channel of the duplex channel set at step 401.

Thereafter, the program proceeds to step 490 wherein base unit 2 is connected to telephone network line 3a, that is, amplifier 227 is released from muting by the cessation of signal MUTE and telephone network line 3a is connected through relay circuit 232 to converting circuit 231.

Meanwhile, identifying code ID transmitted by base unit 2 in step 424 is detected at handset unit 1 in step 325 from the output signal of demodulating circuit 163. In practice, steps 324 and 325 are alternated for a time period equal to a shorter one of the period in which all the channels are scanned in base unit 2 and the period until transmission of identifying code ID from base unit 2 back to handset unit 1 is confirmed. As in the present case it as assumed that base unit 2 transmits the correct identifying code ID back to handset unit 1, program 300 proceeds to step 390 wherein amplifier 127 is released from muting by the cessation of signal MUTE and communication is established between handset unit 1 and base unit 2 over the present channel. In this manner, handset unit 1 is connected to telephone network line 3a through base unit 2.

Thereafter, the operator may input the desired telephone number by operating the buttons on ten-key panel 151 of handset unit 1 and a corresponding dial signal DS (FIG. 3) is generated by control circuit 140, converted to MSK signal Sm by modulating circuit 161 and then transmitted to base unit 2 as described above. In base unit 2 (FIG. 4), dial signal DS is derived from demodulating circuit 263 and tone encoder 264 is controlled by control circuit 240 in response to dial signal DS to generate a tone encode signal TE corresponding to the input telephone number. Signal TE is delivered through amplifier 227, converting circuit 231 and relay circuit 232 to telephone network line 3a. Thereafter, as is conventional, the telephone corresponding to the input number is called and thus the outgoing telephone call is completed.

However, if prior to the initial transmission of identifying code ID by handset unit 1 it is detected at step 321 (FIG. 5B) that the present channel set in step 301 is the same as a detected channel having its identifier stored in any of the areas $A_i$, or if it is detected at step 322 that the present channel is already in use by another cordless telephone, program 300 proceeds to step 306 to increment identifier (CH) by 1 to designate the next channel, and then the program returns to step 301. In other words, if in the talk mode the present channel in step 321 is one of the detected channels, handset unit 1 does not reach step 322 to detect whether the present channel is currently in use. Functionally this means that handset unit 1 scans the communication channels other than those detected ones whose identifiers ($A_i$) are stored in area $A_i$. Thereafter, steps 323–325 (FIG. 5B) and steps 432 and 433 (FIG. 6B) are repeated to detect a vacant channel over which communication thereafter may be carried out.

Furthermore, if at step 325 the correct identifying code ID is not received back from base unit 2 at handset unit 1, program 300 proceeds to step 325 in which control circuit 140 stops signal TXEN to disable the transmission of signal Su, and then returns to step 306. This may occur, for example if the channel set at step 301, while vacant at handset unit 1, is detected with interference at base unit 2 at step 431. Specifically, in base unit 2, if it detected at step 431 that identifier (CH) set at step 401 is equal to any of the stored identifiers ($A_i'$) stored in areas $A_i'$, program 400 proceeds to step 434 in which the FM signal Sd without the identifying code ID is transmitted for a short period of time, for example one second, and then program 400 returns to step 406. This is detected back in handset unit in step 325 as the absence of the identifying code ID. In response thereto, handset unit 1 increments its present channel and transmits identifying code ID over the next vacant channel and again waits for the same to be transmitted back through that next channel. Of course, FM signal Sd (or FM signal Su) without identifying code ID will be detected as interference by any unit in the standby mode.

Thus, when an outgoing telephone call is to be made from handset unit 1 and talk switch 152 is changed over to establish the talk mode, handset unit 1 searches for a vacant channel while skipping those channels previously detected with interference and calls base unit 2 over the detected vacant channel. When base unit 2 responds to the call, communication is established between handset unit 1 and base unit 2 over the detected vacant channel to enable the outgoing telephone call.

Correspondingly, when an incoming telephone message signal is detected on network telephone line 3a at base unit 2, base unit 2 can initiate and establish communication with handset unit 1 in a manner corresponding to the operation described above with regard to an outgoing telephone call. Specifically, at step 402 (FIG. 6A) bell signal BL is detected and program 400 proceeds to carry out steps 421–426/490, while program 300 at handset unit 1 executes steps 331–334. Once again, if the channel initially detected as vacant in base unit 2 is recorded as carrying interference at handset unit 1, cordless telephone 10 will avoid establishment of communication over this initially detected channel and will search further to find a channel vacant at both handset and base units 1, 2.

Thus, when an incoming call is received, it is base unit 2 which searches for a vacant channel while skipping the previously detected channels with interference and calls handset unit 1 over the detected vacant channel. When handset unit 1 responds to the call, communication is established between handset unit 1 and base unit 2 to enable the incoming call to be received.

In accordance with known techniques, one skilled in the art will realize that the operations affected by circuits 161–164 and 216, 264 may be realized by software. Furthermore, the telephone number may be transmitted by dial pulses.

In addition, programs 300 and 400 may be modified so that at steps 324 and 424, respectively, the presence or absence of FM signals Sd and Su may be respectively checked as well as identifying code ID. Only if signals Sd and Su are then detected will the programs respectively proceed to steps 325 and 425 to check whether or not the identifying code ID is transmitted back from the other unit.

In accordance with the present invention, an MCA system cordless telephone without a separate control channel may record channels detected with interference in its memory and thereafter, in searching for a vacant channel, may skip the detected channels. If a vacant channel is thereafter detected, communication between the handset unit and the base unit is established over the detected vacant channel. Thus, communication may be established over a vacant channel without interference from electromagnetic waves transmitted from another cordless telephone or other apparatus. A further advantage is that the communication between the handset unit and the base unit can be promptly established without attempted transmission over channels with interference. Furthermore, since the channels detected with interference are recorded, taken into account the order of detection, these channels will be skipped without error.

Having specifically described a preferred embodiment of the invention, it will be apparent that the invention is not limited to such embodiment, and that many modifications and variations may be effected therein by one skilled in the art without departing form the spirit or scope of the present invention as defined in the appended claims.

We claim:

1. A cordless telephone having a base unit connectable to a telephone network line for receiving and transmitting signals therethrough and a handset unit selectively separable from said base unit, said base and handset units including respective means for the transmission and reception of signals therebetween over any one of a plurality of communication channels, said cordless telephone further comprising:

channel scanning means for scanning said plurality of communication channels, said channel scanning means being operative in a standby mode of said cordless telephone for detecting the ones of said communication channels on which there is interference;

memory means for recording the detected ones of said communication channels on which there is interference;

said channel scanning means further being operative in a talk mode at one of said base and handset units to scan the communication channels other than said detected ones of the communication channels recorded in said memory means to detect a vacant one of said communication channels; and control means for establishing communication between said handset unit and said base unit in said talk mode of said cordless telephone over the detected vacant communication channel.

2. A cordless telephone according to claim 1, wherein said channel scanning means associates a unique identifier with each of said communication channels and said memory means stores therein the identifiers associated with the communication channels on which there is interference.

3. A cordless telephone according to claim 2, wherein said memory means stores up to three of said identifiers.

4. A cordless telephone according to claim 2, wherein said memory means includes a plurality of ordered storage areas for storing respective ones of said identifiers and wherein said control means controls said memory means to store said identifiers in respective ones of said storage areas in a weighted order indicative of the time order of detection thereof.

5. A cordless telephone according to claim 1, wherein said channel scanning means comprises first and second channel scanning devices provided at said base and handset units, respectively, and being independently operable to scan said communication channels, said memory means comprises first and second memory devices provided at said base and handset units, respectively, for recording the communication channels on which interference is detected by the first and second channel scanning devices, respectively, and said control means includes first and second control devices provided at said base and handset units, respectively.

6. A cordless telephone according to claim 5, wherein each of said channel scanning devices associates a unique identifier with each of said communication channels and each of said memory devices stores therein the identifiers associated with the communication channels on which interference is detected by the respective channel scanning devices in the standby mode, and wherein the control device at one of said base and handset units establishes said communication by transmitting a signal over the detected vacant communication channel to said other of said base and handset units, said control device at the other unit thereafter detecting whether the detected vacant is associated with an identifier stored in the memory device at said other unit.

7. A cordless telephone according to claim 6, wherein said control device at said other unit transmits a return signal in response to an absence of association detected between said detected vacant communication channel and all of the identifiers stored in the memory device at said other unit.

8. A cordless telephone according to claim 1, wherein said channel scanning means is operative in said standby mode for detecting the ones of said communication channels on which there is interference separately for each of said base and handset units, and said memory means separately records the detected ones of said communication channels on which there is interference at said base and handset units, and wherein in said talk mode said channel scanning means scans the communication channels other than said detected ones of the communication channels recorded in the memory means separately for one of said base and handset units to detect the vacant communication channel, said control means transmits a signal to the other of said units over said detected vacant communication channel, and said other unit thereafter detects whether the detected vacant communication channel corresponds to a detected communication channel recorded in the memory means separately for said other unit and transmits a return signal to said one unit in the absence of correspondence.

* * * * *